(12) United States Patent
Williams et al.

(10) Patent No.: US 9,396,554 B2
(45) Date of Patent: Jul. 19, 2016

(54) APPARATUS FOR AND METHOD OF ESTIMATING DIMENSIONS OF AN OBJECT ASSOCIATED WITH A CODE IN AUTOMATIC RESPONSE TO READING THE CODE

(71) Applicant: SYMBOL TECHNOLOGIES, INC., Lincolnshire, IL (US)

(72) Inventors: Jay J Williams, Glenview, IL (US); Kevin J O'Connell, Palatine, IL (US); Ankur R Patel, Palatine, IL (US); Cuneyt M Taskiran, Chicago, IL (US)

(73) Assignee: Symbol Technologies, LLC, Holtsville, NY (US)

(*) Notice: Subject to any disclaimer, the term of this patent is extended or adjusted under 35 U.S.C. 154(b) by 0 days.

(21) Appl. No.: 14/561,329

(22) Filed: Dec. 5, 2014

(65) Prior Publication Data

US 2016/0163067 A1    Jun. 9, 2016

(51) Int. Cl.
*G06K 19/00* (2006.01)
*G06T 7/60* (2006.01)
*G06K 7/10* (2006.01)
*G06K 7/14* (2006.01)
*G06T 7/00* (2006.01)
*G06K 9/00* (2006.01)

(52) U.S. Cl.
CPC ............ *G06T 7/602* (2013.01); *G06K 7/10722* (2013.01); *G06K 7/1443* (2013.01); *G06K 9/00201* (2013.01); *G06T 7/004* (2013.01); *G06T 7/0051* (2013.01); *G06T 2207/10028* (2013.01)

(58) Field of Classification Search
USPC .................................. 235/435, 439, 454, 462
See application file for complete search history.

(56) References Cited

U.S. PATENT DOCUMENTS

| 7,248,754 B2 | 7/2007 | Cato |
| 7,373,722 B2 | 5/2008 | Cooper et al. |
| 7,527,205 B2 | 5/2009 | Zhu et al. |
| 7,726,575 B2 | 6/2010 | Wang et al. |
| 8,132,728 B2 | 3/2012 | Dwinell et al. |

(Continued)

FOREIGN PATENT DOCUMENTS

| CA | 2835830 A1 | 11/2012 |
| WO | 03002935 | 1/2003 |
| WO | 2008154611 A2 | 12/2008 |

OTHER PUBLICATIONS

"Fair Billing with Automatic Dimensioning" pp. 1-4, undated, Cipyright Mettler-Toledo International Inc.

(Continued)

*Primary Examiner* — Matthew Mikels (57) ABSTRACT

Dimensions of an object associated with an electro-optically readable code are estimated by aiming a handheld device at a scene containing the object supported on a base surface. A scanner on the device scans the scene over a field of view to obtain a position of a reference point of the code associated with the object, and reads the code. A dimensioning sensor on the device captures a three-dimensional (3D) point cloud of data points of the scene in automatic response to the reading of the code. A controller clusters the point cloud into data clusters, locates the reference point of the code in one of the data clusters, extracts from the point cloud the data points of the one data cluster belonging to the object, and processes the extracted data points belonging to the object to estimate the dimensions of the object.

18 Claims, 5 Drawing Sheets

(56) References Cited

U.S. PATENT DOCUMENTS

| | | | |
|---|---|---|---|
| 8,265,895 B2 | 9/2012 | Willins et al. | |
| 8,284,988 B2 | 10/2012 | Sones et al. | |
| 8,463,079 B2 | 6/2013 | Ackley et al. | |
| 8,479,996 B2 | 7/2013 | Barkan et al. | |
| 8,599,303 B2 | 12/2013 | Stettner | |
| 8,757,479 B2 | 6/2014 | Clark et al. | |
| 2007/0272732 A1 | 11/2007 | Hindman | |
| 2009/0323121 A1* | 12/2009 | Valkenburg | G01B 11/002 358/1.18 |
| 2011/0137527 A1 | 6/2011 | Simon et al. | |
| 2013/0228620 A1* | 9/2013 | Ahern | G01C 15/002 235/439 |
| 2013/0329013 A1 | 12/2013 | Metois et al. | |
| 2014/0028837 A1 | 1/2014 | Gao et al. | |
| 2014/0100813 A1 | 4/2014 | Showering | |
| 2014/0104413 A1 | 4/2014 | McCloskey et al. | |

OTHER PUBLICATIONS

"Swift Dimension" Trademark Omniplanar, undated.

"Plane Detection in Point Cloud Data" dated Jan. 25, 2010 by Michael Ying Yang and Wolfgang Forstner, Technical Report 1,2010, University of Bonn.

International Search Report and Written Opinion mailed Jan. 4, 2016 in counterpart PCT application No. PCT/US2015/055982.

\* cited by examiner

…

APPARATUS FOR AND METHOD OF ESTIMATING DIMENSIONS OF AN OBJECT ASSOCIATED WITH A CODE IN AUTOMATIC RESPONSE TO READING THE CODE

BACKGROUND OF THE INVENTION

The present disclosure relates generally to capturing dimension data indicative of the dimensions of an object associated with an electro-optically readable code and, more particularly, to an apparatus for, and a method of, estimating the dimensions or volume of the object in automatic response to reading the code associated with the object.

Determining the dimensions or volume of an object, such as a shipping package, a mailing parcel, or a pallet loaded with a plurality of objects as freight or cargo, is desirable, especially in the transportation and shipping industries, where the cost for transporting and delivering the objects is at least partially dependent on their dimensions. Each such object is generally associated with an electro-optically readable code that identifies the object when read by an electro-optical scanner or reader. Three-dimensional (3D) cameras have also been employed in both handheld and fixed devices to capture dimension data indicative of the dimensions of an object over a field of view. Although generally satisfactory for its intended purpose, the known 3D camera is not altogether satisfactory when multiple objects are contained in its field of view, since the camera cannot readily distinguish between the object to be dimensioned, i.e., the primary object or main target of interest, and other secondary objects whose dimensions are not wanted.

Accordingly, there is a need to estimate the dimensions or volume of a main object of interest, especially when other secondary objects are nearby, in an accurate, rapid, and efficient manner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an apparatus for estimating the dimensions of an object associated with an electro-optically readable code, e.g., a Universal Product Code (UPC) bar code symbol, an Electronic Product Code (EPC) symbol, or a like code standard, that identifies the object. A handheld device is aimable at a scene containing the object supported on a base surface. A scanner, e.g., an electro-optical reader, is supported by the device, scans the scene over a field of view to obtain a position of a reference point of the code associated with the object, and reads the code. A dimensioning sensor, e.g., a three-dimensional (3D) camera, is supported by the device and, in automatic response to the reading of the code, captures a 3D point cloud of data points of the scene. A controller clusters the point cloud into data clusters, locates the reference point of the code in one of the data clusters, extracts from the point cloud the data points of the one data cluster belonging to the object, and processes the extracted data points belonging to the object to estimate the dimensions of the object.

In a preferred embodiment, the controller detects a base plane indicative of the base surface from the point cloud, processes the extracted data points belonging the object to obtain a convex hull, and fits a bounding box of minimum volume to enclose the convex hull. The bounding box has a pair of mutually orthogonal planar faces. The controller orients one of the faces to be generally perpendicular to the base plane, and simultaneously orients the other of the faces to be generally parallel to the base plane. Advantageously, the dimensioning sensor captures each data point to include data indicative of a length (x), a width (y), and a depth (z) of the object, and the controller locates length (x) and width (y) coordinates of the reference point of the code.

In accordance with another aspect of this disclosure, a method of estimating dimensions of an object associated with an electro-optically readable code, is performed by aiming a handheld device at a scene containing the object supported on a base surface; and by scanning the scene over a field of view of a scanner supported by the device to obtain a position of a reference point of the code associated with the object, and by reading the code. The method is further performed by capturing, in automatic response to the reading of the code, a three-dimensional (3D) point cloud of data points of the scene with a dimensioning sensor supported by the device; clustering the point cloud into data clusters; locating the reference point of the code in one of the data clusters; extracting from the point cloud the data points of the one data cluster belonging to the object; and processing the extracted data points belonging to the object to estimate the dimensions of the object.

Figure 1:
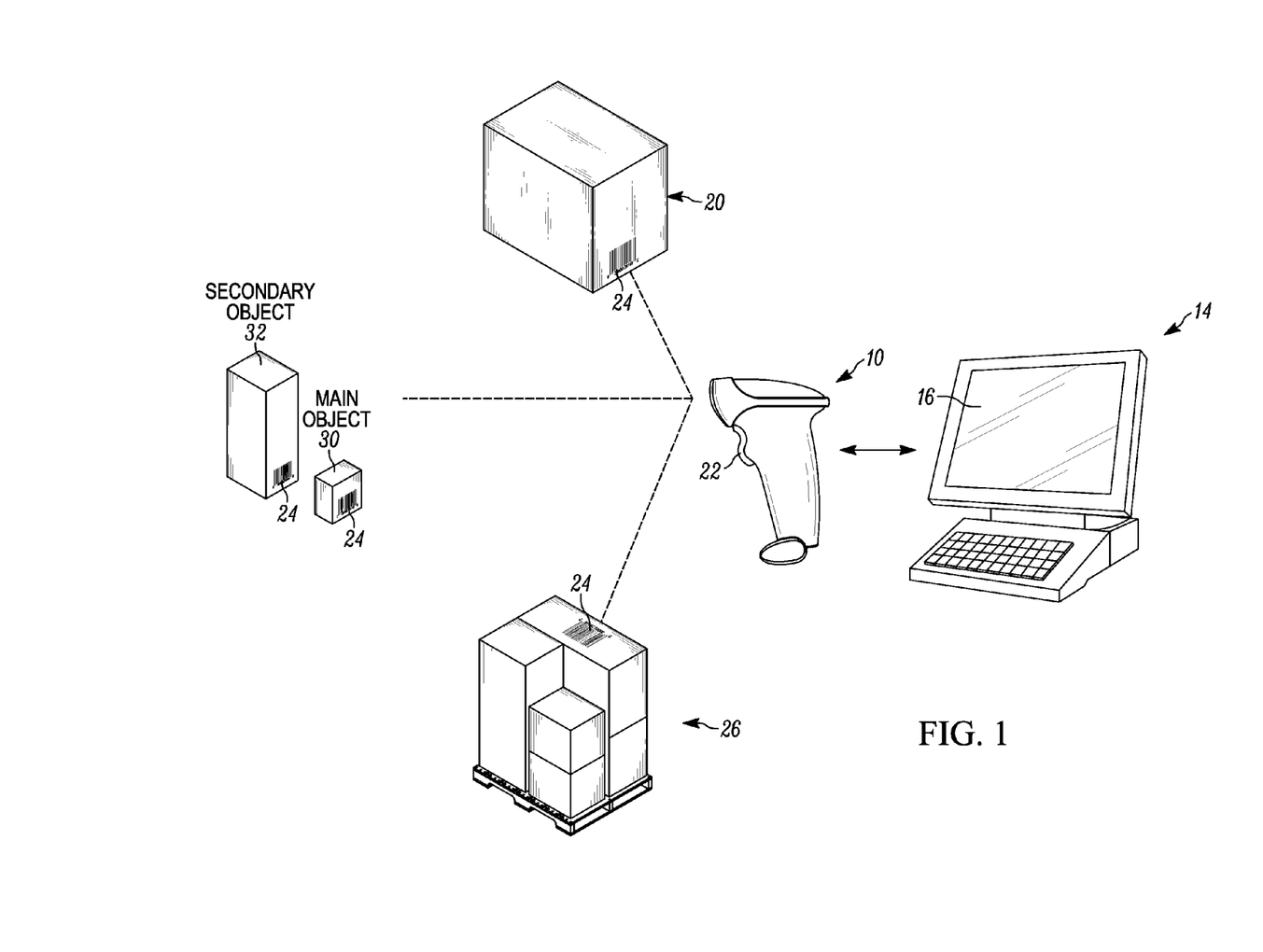
FIG. 1 is a schematic view of an apparatus for estimating the dimensions of an object associated with an electro-optically readable code in accordance with the present disclosure.
Figure 2:
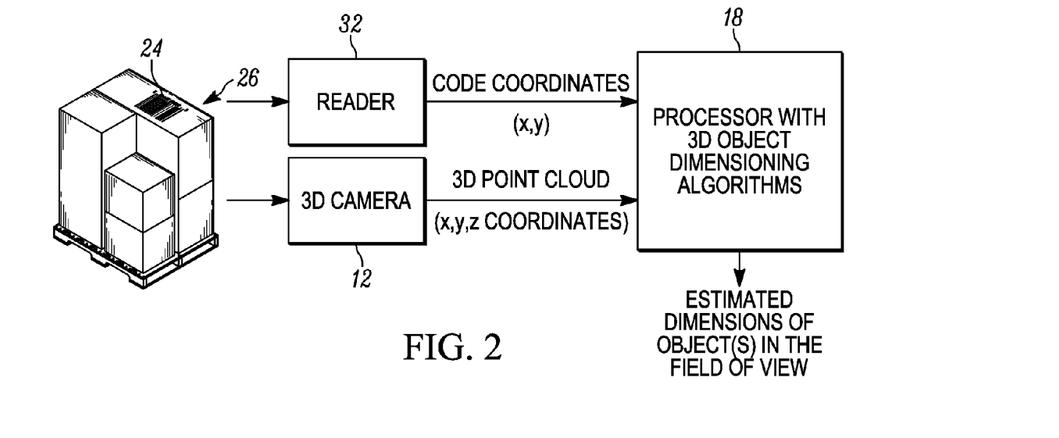
FIG. 2 is a block diagram of the overall apparatus of FIG. 1.

Turning now to the drawings, FIG. 1 depicts a device 10 for supporting a dimensioning sensor or three-dimensional (3D) camera 12 and a scanner or electro-optical reader 32 (see FIG. 2). The camera 12 and the reader 32 are thus both integrated in the device 10. The device 10 is operatively connected, either by a wired or wireless link, to a computer 14 having a display 16. A controller 18 (see FIG. 2) is located either in the device 10 or the computer 14. The camera 12, the reader 32, and the controller 18 are together operative, as described below, for dimensioning objects of various sizes and shapes, such as a cuboid shipping carton 20, or a pallet 26 loaded with a plurality of randomly stacked objects as freight or cargo, or a set of objects such as a main object 30 and a secondary object 32. It will be understood that these are merely exemplary objects, and that many other objects having many other shapes could have been illustrated.

As also shown in FIG. 1, the carton 20, the pallet 26, and the set of objects 30, 32, each bear a code 24, typically imprinted on an adhesive label (not illustrated). Although a Universal Product Code (UPC) bar code symbol has been illustrated in FIG. 1, it will be understood that this is merely an example, because other machine-readable codes, such as an Electronic Product Code (EPC) symbol, a Quick Response (QR) symbol, or a like code standard, including one- or two- or three-dimensional codes, could be employed to identify each object. It will be further understood that one or more codes may constitute the code 24.

The device 10 is a handheld, portable device having a handle that can be gripped by a user, and a manually actuatable trigger 22. The handheld device 10 is thus held by the user and aimed at a scene containing the object. Although the computer 14 has been illustrated as a desktop computer, it will be understood that the computer could also be a laptop computer, a smartphone, or a tablet. Although the handheld device 10 and the computer 14 have been illustrated as separate units, they can also be integrated into a single unit.

Figure 3:
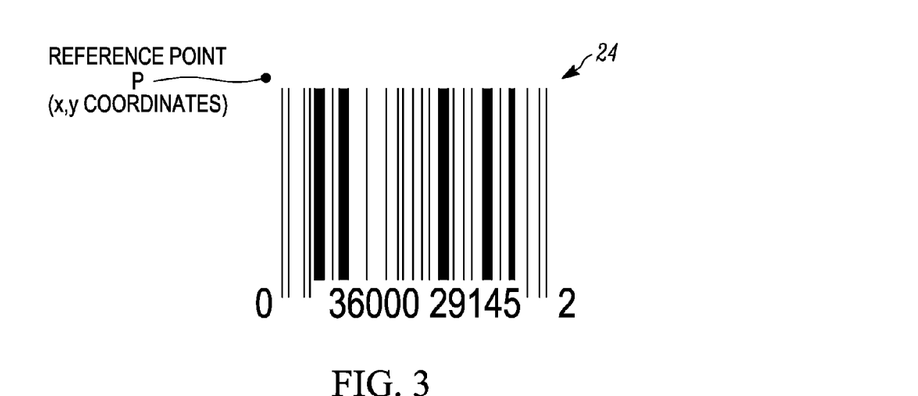
FIG. 3 is a top plan view of the code associated with the object, together with a reference point of the code.

As shown in FIG. 2 for the representative pallet 26 associated with the code 24, the reader 32 is operative for scanning the scene over a field of view and, in cooperation with the controller 18, a position of a reference point P of the code 24 (see FIG. 3) associated with the object is obtained, and the code 24 is read. The reader 32 may be a laser-based reader in which a laser beam is swept across the code 24 for reflection and scattering therefrom, and the return laser light is detected, digitized, decoded, and processed into data identifying the object. The reader 32 may alternatively be a solid-state imager-based reader having an imaging sensor in which a charge coupled device (CCD) or a complementary metal oxide semiconductor (CMOS) device captures return light from the code 24, and processes the return light into data identifying the object. The length (x) and width (y) coordinates of the reference point P are determined by the reader 32 and the controller 18. The reference point P may be located either inside, or outside, or anywhere, relative to the code 24, and preferably, is located at one of the corners of the code 24. As shown in FIG. 3, the reference point P is located at the upper left corner of the code 24.

As also shown in FIG. 2 for the representative pallet 26, the 3D camera 12 is operative for capturing a three-dimensional (3D) point cloud of data points over its field of view. Any 3D sensor, including an infrared (IR) sensor, could be used. The 3D sensor may either be a discrete component separate from the imaging sensor of the reader 32, or may be the same component as the imaging sensor of the reader 32. Each data point has a length coordinate (x), a width coordinate (y), and a depth coordinate (z). The controller 18 may be any general purpose microprocessor, controller, or microcontroller that is suitably configured with memory, and that is capable of executing one or more software applications or algorithms, as indicated by the flow chart of FIG. 4, to thereby provide the desired functionality, i.e., to output the estimated dimensions or volume of the main object in the field of view.

Figure 4:
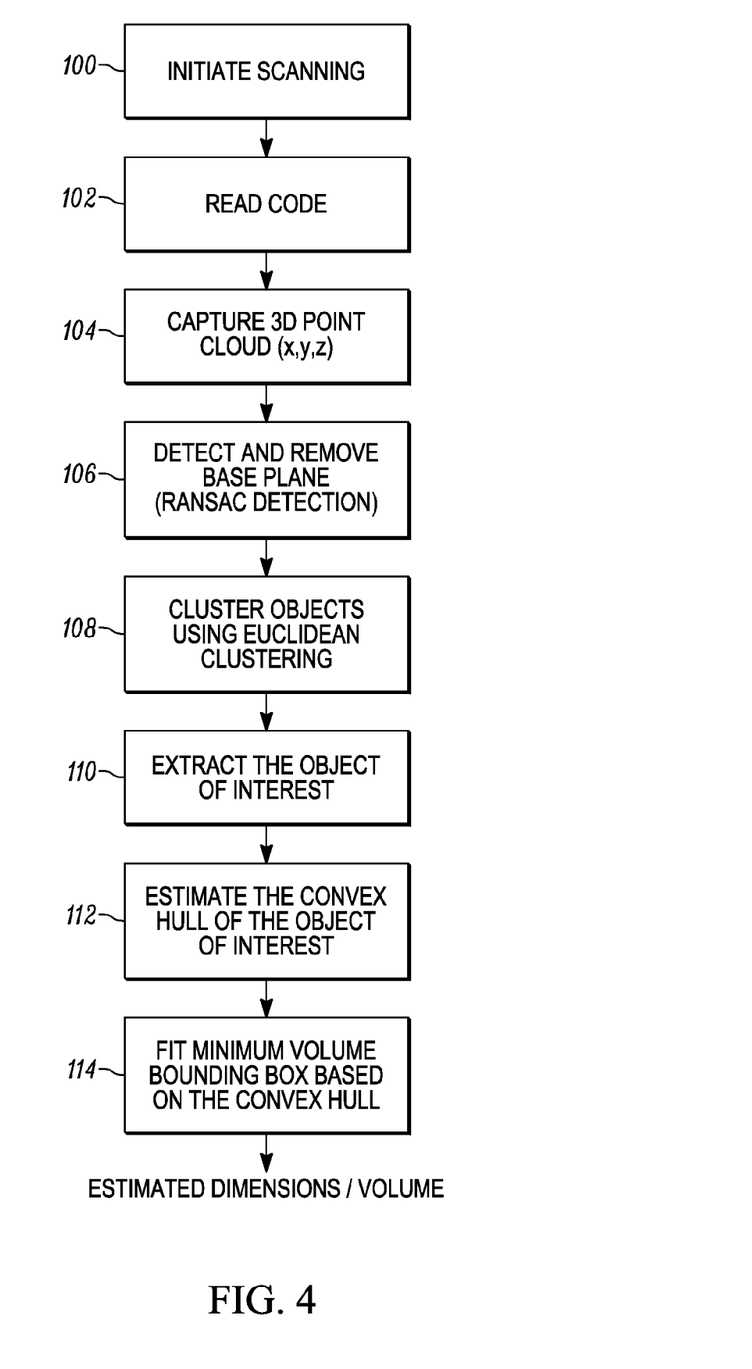
FIG. 4 is a flow chart of a method of estimating the dimensions of an object associated with an electro-optically readable code in accordance with the present disclosure.

Turning now to the flow chart of FIG. 4, the method begins by initiating scanning at step 100 in which the user holds and aims the device 10 at a scene that contains at least one object 30, 32 (see FIG. 5A) and a base surface or background 34 on which each object 30, 32 is positioned, and by manually actuating the trigger 22. In response to the trigger actuation, the reader 32 in step 102 scans the scene over a field of view and, in cooperation with the controller 18, the position, i.e., the (x, y) coordinates, of the reference point P of the code 24 associated with the main object 30 is obtained, and the code 24 is read.

Figure 5A:
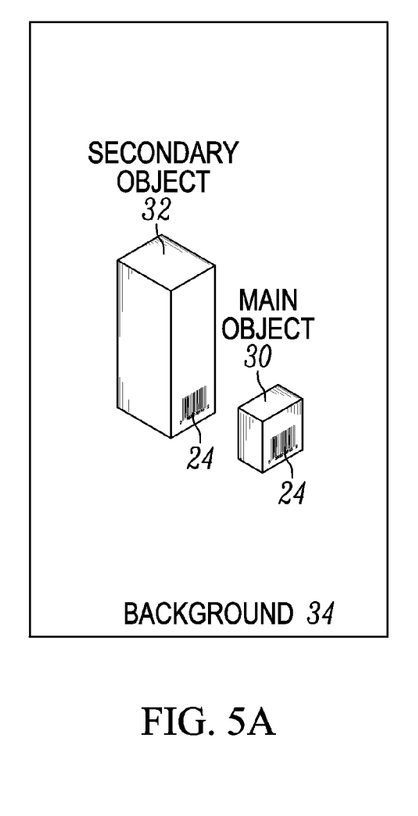
FIG. 5A is a perspective view of a scene containing a main object and a secondary object supported on a base surface or background.
Figure 5B:
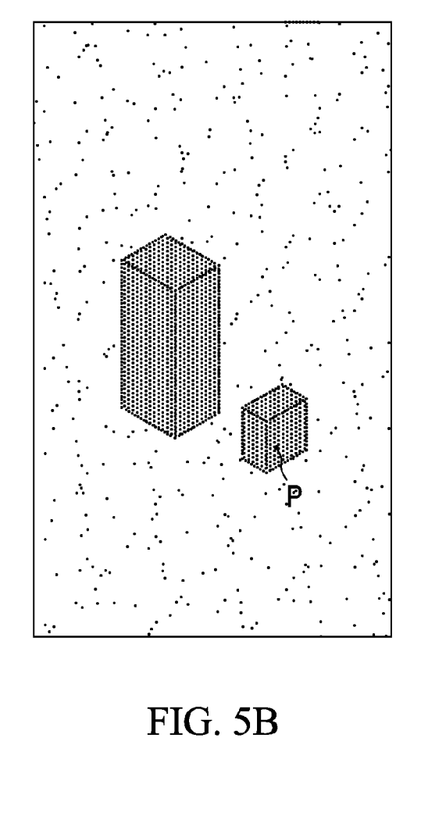
FIG. 5B is a perspective view of a 3D point cloud of the scene of FIG. 5A.

In automatic response to reading the code 24, the camera 12 captures, in step 104, a three-dimensional (3D) point cloud of data points over a field of view of the scene containing the objects 30, 32 and the background 34 on which the objects 30, 32 are positioned. For ease of visualization, FIG. 5A depicts an exemplary scene that a user might see. Thus, FIG. 5A depicts a main object or object of interest 30, one or more secondary objects 32, and the background 34 (in this case, the floor). FIG. 5B depicts the 3D point cloud of the scene of FIG. 5A. Each data point in the point cloud has a length coordinate (x), a width coordinate (y), and a depth coordinate (z).

In step 106, a base plane indicative of the base surface 34 is detected from the data points. In a preferred embodiment, the detecting of the base plane is performed by determining from the data points the plane having the largest area in the field of view, e.g., by executing a random sampling consensus (RANSAC) algorithm. Details of plane detection by using the RANSAC algorithm can be had by reference to "*Plane Detection in Point Cloud Data*", by Yang et al., Technical Report No. 1, Department of Photogrammetry, University of Bonn, Jan. 25, 2010, the entire contents of which is incorporated herein by reference thereto. Once the base plane has been detected, its data points can be removed from the 3D point cloud. This leaves only the data points corresponding to the main object 30 and the secondary object 32 for further processing.

In step 108, the remaining data points are clustered, e.g., by Euclidean clustering. Clustering is a well established technique in which a multitude of data points are organized in groups or data clusters that share some similarity, e.g., a distance or closeness to each other. Now that the data points have been clustered, each of the multiple objects 30, 32 in the field of view have now been located. In step 110, the main object 30 is extracted. This is performed by locating the reference point P in one of the data clusters. This one data cluster is the one that belongs to the main object 30. Thus, the data points of the object of interest, i.e., the main object 30, is extracted, and all the data points of the secondary object 32 are discarded.

Figure 5C:
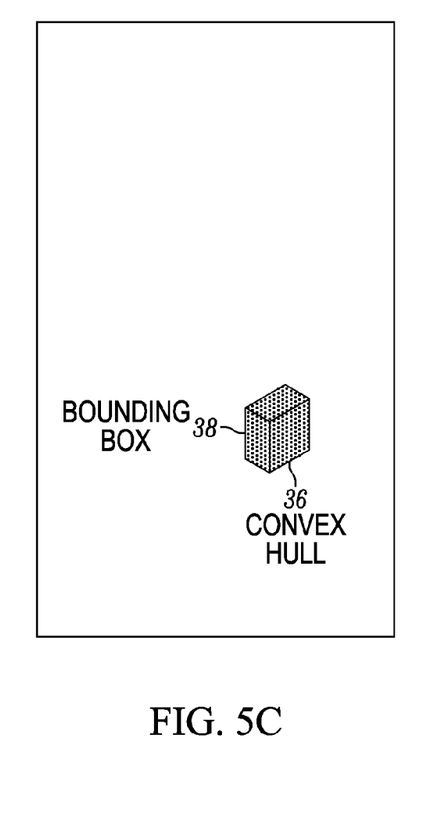
FIG. 5C is a perspective view of a minimum volume bounding box surrounding a convex hull of a data cluster belonging to the main object.

The extracted data points of the data cluster belonging to the main object 30 is depicted in FIG. 5C and processed to obtain, in step 112, a convex hull 36. The convex hull 36 constitutes only those exterior data points located on the outside boundary or envelope of the data points belonging to the main object 30. Obtaining the convex hull is a well established technique of estimating the boundary of multiple data points. See, for example, http://en.wikipedia.org/wiki/Convex hull. In this case, the convex hull 36 of the main object 30 is determined, and the remaining interior data points of the data points belonging to the main object 30 inside the convex hull 36 are discarded.

Figure 6:
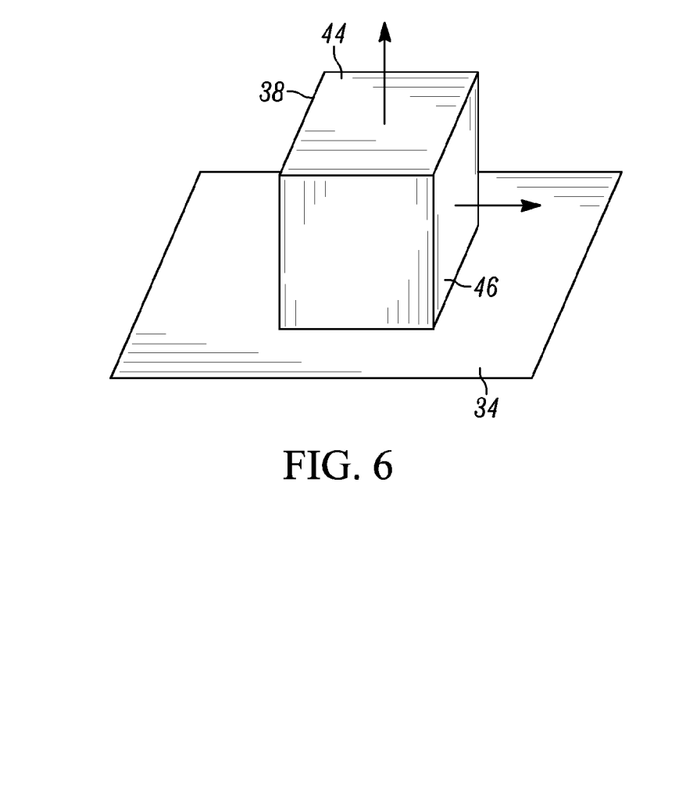
FIG. 6 is a diagrammatic view showing how the bounding box is to be oriented relative to the base surface or background.

In step 114, a bounding box 38 (see FIG. 5C) is fitted to enclose the convex hull 36 with a minimum volume. Fitting a bounding box 38 of minimum volume around data points is a well established technique. See, for example, http://en.wikipedia.org/wiki/Minimum bounding box. In this case, the bounding box 38 has a rectangular parallelepiped or cuboid shape having three pairs of mutually orthogonal planar faces, and is fitted around the convex hull 36. As can be seen in FIG. 5C, the volume of the bounding box 38 closely matches the dimensions or volume of the extracted, clustered data points of the main object 30, thereby accurately dimensioning the main object 30. As shown in FIG. 6, the bounding box 38, as proposed by the present disclosure, is oriented with certain facial constraints. Specifically, at least one of the faces of the bounding box 38, e.g., the top face 44, is oriented to be generally parallel to the base plane 34, and simultaneously one of the other faces of the bounding box 38, e.g., the side face 46, that is orthogonal to the top face 44, is oriented to be generally perpendicular to the base plane 34. The arrows illustrated in FIG. 6 identify the normals to the faces 44, 46.

Figure 7:
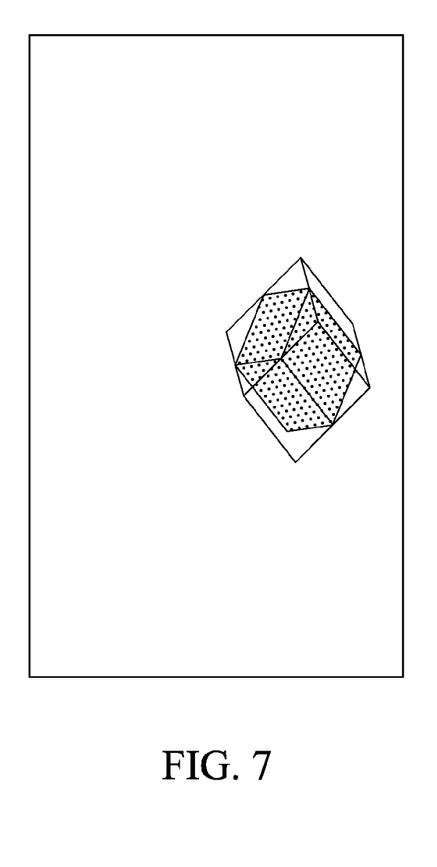
FIG. 7 is a view analogous to FIG. 5C, but showing an inclined bounding box that is not oriented in the manner dictated by FIG. 6.

FIG. 7 is to be contrasted with FIG. 5C. Both show bounding boxes fitted to enclose a convex hull with a minimum volume. However, the bounding box of FIG. 7 does not have the facial constraints described above in connection with FIG. 6 and is inclined relative to the base plane 34. As a result, the bounding box of FIG. 7 does not provide as accurate an estimation of the dimensions or volume of the carton stack as compared to the bounding box 38 of FIG. 5C.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for estimating dimensions of an object associated with an electro-optically readable code, comprising:
   a handheld device aimable at a scene containing the object supported on a base surface;
   a scanner supported by the device and operative for scanning the scene over a field of view to obtain a position of a reference point of the code associated with the object, and for reading the code;

a dimensioning sensor supported by the device and operative, in automatic response to the reading of the code, for capturing a three-dimensional (3D) point cloud of data points of the scene;

a controller for clustering the point cloud into data clusters, for locating the reference point of the code in one of the data clusters, for extracting from the point cloud the data points of the one data cluster belonging to the object, and for processing the extracted data points belonging to the object to estimate the dimensions of the object; and wherein the controller is operative for detecting a base plane indicative of the base surface from the point cloud, for processing the extracted data points belonging to the object to obtain a convex hull, and for fitting a bounding box of minimum volume to enclose the convex hull, the bounding box having a pair of mutually orthogonal planar faces, the controller being operative for orienting one of the faces to be generally perpendicular to the base plane, and for simultaneously orienting the other of the faces to be generally parallel to the base plane.

2. The apparatus of claim 1, wherein the handheld device has a handle for gripping by a user, and a trigger manually actuatable by the user for initiating the reading of the code.

3. The apparatus of claim 1, wherein the code is a barcode symbol, and wherein the scanner is an electro-optical reader for electro-optically reading the barcode symbol.

4. The apparatus of claim 1, wherein the dimensioning sensor captures each data point to include data indicative of a length, a width, and a depth of the object, and wherein the controller locates length and width coordinates of the reference point of the code.

5. The apparatus of claim 1, wherein the controller is operative for locating the reference point at a corner of the code.

6. The apparatus of claim 1, wherein the controller is operative for determining the base plane as the plane having the largest area in the field of view.

7. The apparatus of claim 1, wherein the controller is operative for determining the base plane by executing a random sampling consensus (RANSAC) algorithm.

8. The apparatus of claim 1, wherein the controller is operative for extracting the data points belonging to the object by removing the data points of the base plane from the point cloud.

9. The apparatus of claim 1, wherein the bounding box is a cuboid having three pairs of mutually orthogonal planar faces.

10. A method of estimating dimensions of an object associated with an electro-optically readable code, comprising:

aiming a handheld device at a scene containing the object supported on a base surface;

scanning the scene over a field of view of a scanner supported by the device to obtain a position of a reference point of the code associated with the object, and reading the code;

capturing, in automatic response to the reading of the code, a three-dimensional (3D) point cloud of data points of the scene with a dimensioning sensor supported by the device;

clustering the point cloud into data clusters;

locating the reference point of the code in one of the data clusters;

extracting from the point cloud the data points of the one data cluster belonging to the object processing the extracted data points belonging to the object to estimate the dimensions of the object and detecting a base plane indicative of the base surface from the point cloud, processing the extracted data points belonging to the object to obtain a convex hull, and fitting a bounding box of minimum volume to enclose the convex hull, the bounding box having a pair of mutually orthogonal planar faces; and orienting one of the faces to be generally perpendicular to the base plane, and simultaneously orienting the other of the faces to be generally parallel to the base plane.

11. The method of claim 10, and gripping the handheld device by a handle, and manually actuating a trigger to initiate the reading of the code.

12. The method of claim 10, and configuring the code as a barcode symbol, and wherein the scanning is performed by electro-optically reading the barcode symbol.

13. The method of claim 10, and capturing each data point to include data indicative of a length, a width, and a depth of the object, and locating length and width coordinates of the reference point of the code.

14. The method of claim 10, and locating the reference point at a corner of the code.

15. The method of claim 10, and determining the base plane as the plane having the largest area in the field of view.

16. The method of claim 10, and determining the base plane by executing a random sampling consensus (RANSAC) algorithm.

17. The method of claim 10, and extracting the data points belonging to the object by removing the data points of the base plane.

18. The method of claim 10, and configuring the bounding box as a cuboid having three pairs of mutually orthogonal planar faces.

* * * * *